(12) United States Patent
Shimoda et al.

(10) Patent No.: US 8,033,415 B2
(45) Date of Patent: Oct. 11, 2011

(54) STRUCTURE OF OPENING SECTION OF FUEL TANK

(75) Inventors: Yoshiki Shimoda, Aichi-ken (JP); Hiroaki Suganuma, Aichi-ken (JP)

(73) Assignee: FTS Co., Ltd., Toyota, Aichi Prefecture (JP)

( * ) Notice: Subject to any disclaimer, the term of this patent is extended or adjusted under 35 U.S.C. 154(b) by 180 days.

(21) Appl. No.: 12/461,826

(22) Filed: Aug. 25, 2009

(65) Prior Publication Data
US 2010/0051621 A1  Mar. 4, 2010

(30) Foreign Application Priority Data

Aug. 29, 2008 (JP) ................................. 2008-221146
May 26, 2009 (JP) ................................. 2009-126670

(51) Int. Cl.
*B65D 88/12* (2006.01)
*B65D 41/06* (2006.01)
*B60K 15/05* (2006.01)

(52) U.S. Cl. ....................... 220/562; 220/300

(58) Field of Classification Search .......... 220/562–564, 220/4.14, 293, 297, 300, 319; 137/590; 123/509; 141/348, 368; 292/256.6
See application file for complete search history.

(56) References Cited

U.S. PATENT DOCUMENTS

| 7,341,047 | B2 * | 3/2008 | Sone et al. | 123/509 |
| 2004/0245253 | A1 | 12/2004 | Zdroik | |
| 2005/0194796 | A1 | 9/2005 | Powell | |
| 2006/0113309 | A1 | 6/2006 | Zdroik et al. | |
| 2008/0210692 | A1 * | 9/2008 | Fujita | 220/562 |

FOREIGN PATENT DOCUMENTS

| JP | 2005-248954 | 9/2005 |
| JP | 2006-526542 | 11/2006 |
| WO | WO 2005/000686 A2 | 1/2005 |

* cited by examiner

*Primary Examiner* — Harry Grosso
(74) *Attorney, Agent, or Firm* — McGinn IP Law Group, PLLC

(57) ABSTRACT

A structure of an opening section of a fuel tank, which is capable of detaching a tank cap without damaging positioning projections provided in the tank cap. The opening section has a cylindrical portion extending outwardly from a tank main body, and a metallic annular tank cap engaging member having a plurality of engaging holes is attached to the cylindrical portion. A plurality of engaging claw parts of a metallic annular attaching member are engaged in the engaging holes of the tank cap engaging member to hold the tank cap with the attaching member and the tank cap engaging member. The tank cap has tank cap positioning projections, and the tank cap engaging member has positioning holes for insertion of the tank cap positioning projections, and at least one engaging claw part and at least one engaging hole are respectively made longer in a circumferential direction than remaining engaging claw parts and remaining engaging holes.

8 Claims, 8 Drawing Sheets

STRUCTURE OF OPENING SECTION OF FUEL TANK

CROSS-REFERENCE TO RELATED APPLICATION

This application is related to and claims priority from Japanese patent applications Nos. 2008-221146 and 2009-126670 incorporated herein by reference.

BACKGROUND OF THE INVENTION

1. Field of the Invention

The present invention relates to a structure of an opening section of a fuel tank made of a thermoplastic synthetic resin.

2. Description of Related Art

Conventionally, fuel tanks made of metals have been used as fuel tanks for use in motor vehicles, etc. but, recently, fuel tanks made of thermoplastic synthetic resins have been frequently used, because they can effect lightweight vehicle bodies, no rust is generated therein, and they can be readily formed into desired configurations.

In many cases, the fuel tanks made of thermoplastic synthetic resins have been manufactured by the blow molding method, because tubular bodies can be readily formed. With the blow molding method, a parison of a molten thermoplastic synthetic resin formed into a cylindrical configuration is extruded from the upper side of a mold, and air is blown into the parison while holding the parison with the mold, thereby manufacturing fuel tanks for use in motor vehicles.

Such a fuel tank has an opening section for removing or putting tank parts from or in an interior of the fuel tank. The opening section of the fuel tank is formed integrally with a tank main body upon forming the tank main body by the blow molding method.

Alternatively, the fuel tank have been manufactured by forming an upper tank member and a lower tank member separately by the injection molding method, and welding them together. In this case, an opening section is also provided for removing or putting a fuel pump, etc. from or in the fuel tank.

Figure 1:
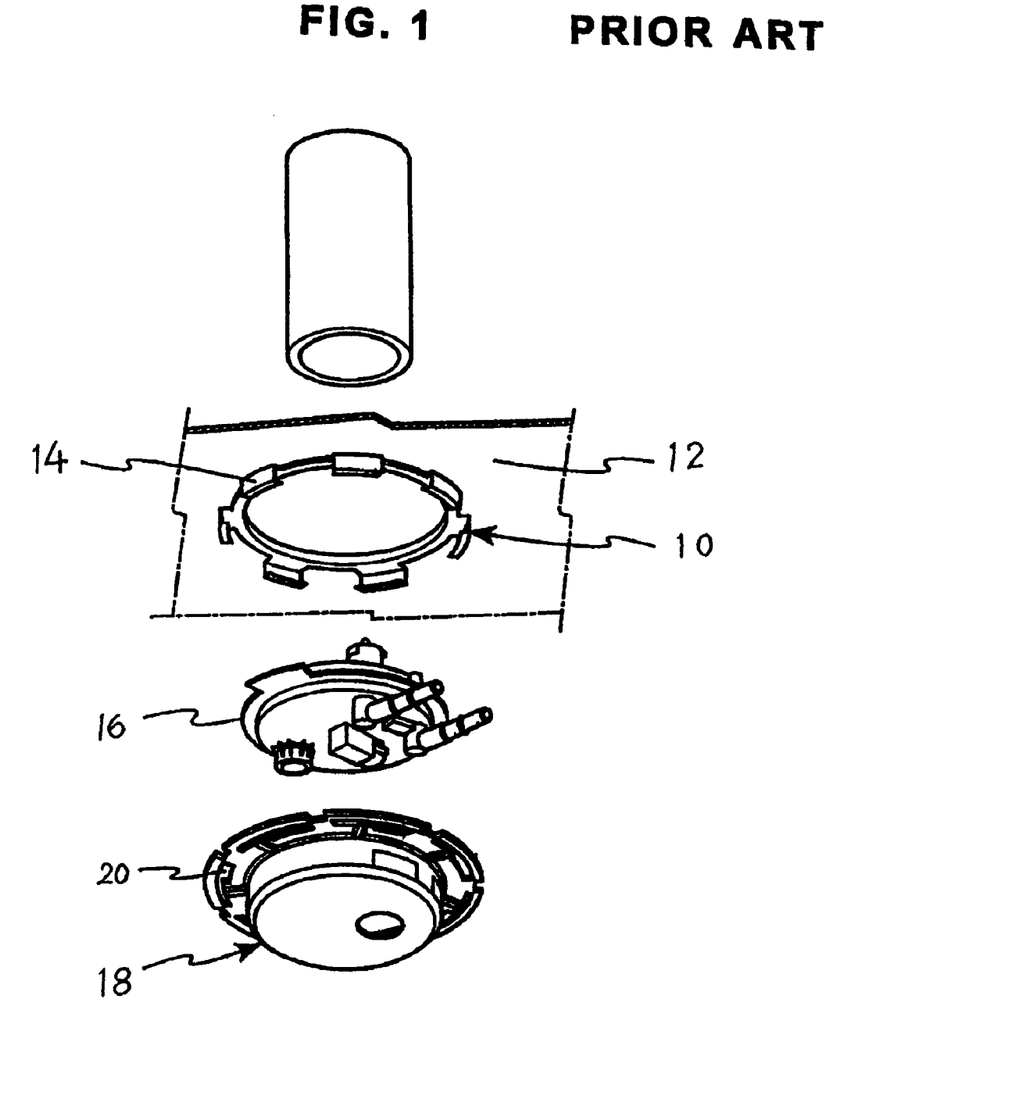
FIG. 1 is an exploded perspective view of an opening section of a tank main body of a conventional fuel tank.

In order to open and close this opening section, a camlock type opening structure has been used (See Published Japanese patent application No. 2005-248954 and Japanese translation of PCT International application No. 2006-526542, for example.) As shown in FIG. 1, an engaging member 10 is provided in an opening section 12 of a tank. The engaging member 10 has a plurality of hook-shaped claw parts 14. A tank cap 16 is held with the engaging member 10 and an attaching member 18 while engaging the claw parts 14 in holes 20 provided in the attaching member 18. As a result, the tank cap 16 is attached to the opening section 12.

Figure 2:
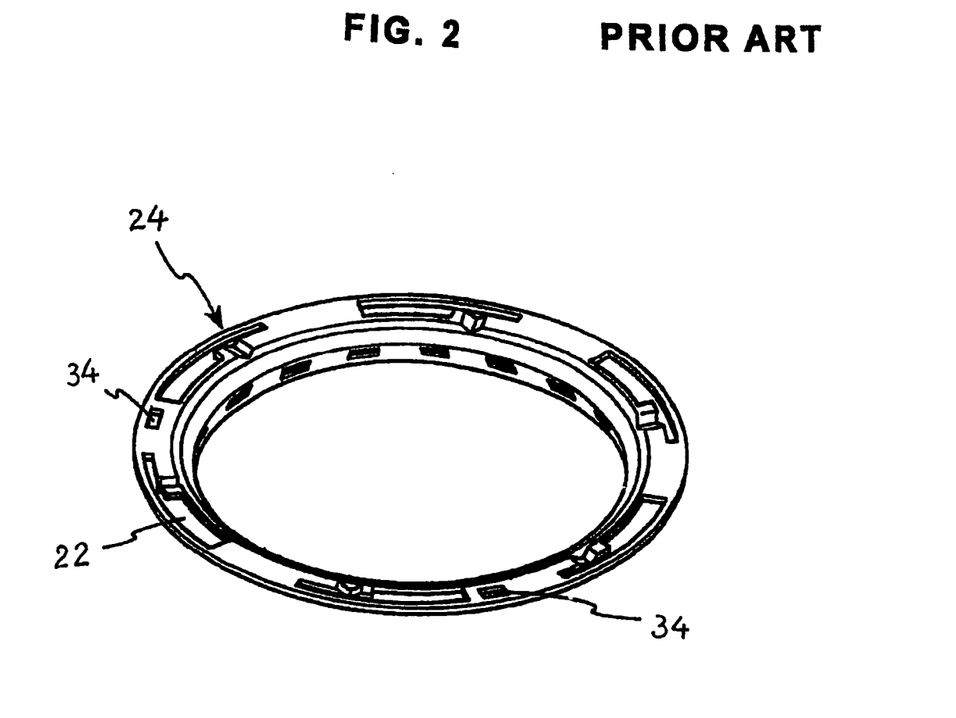
FIG. 2 is a perspective view of a lock plate used in an opening section of a tank main body of another conventional fuel tank.
Figure 3:
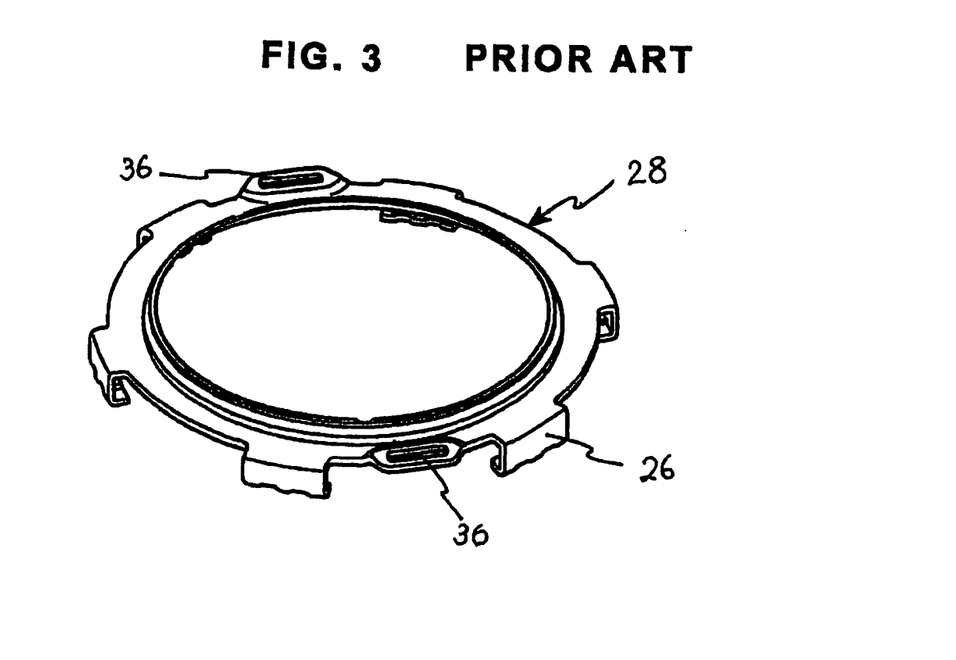
FIG. 3 is a perspective view of an engaging ring used in another conventional fuel tank.
Figure 4:
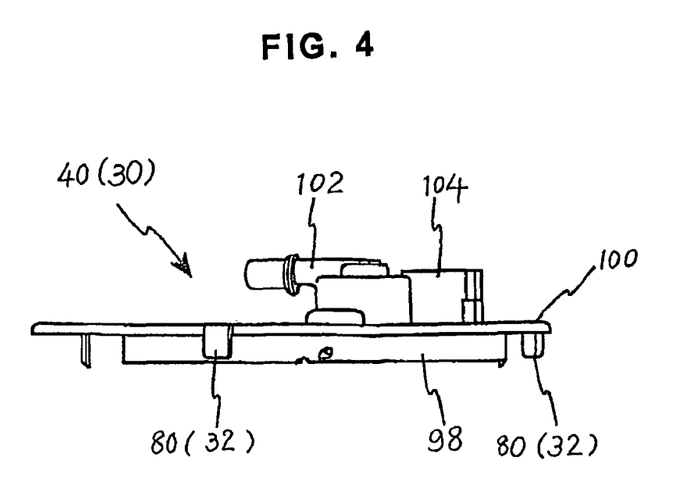
FIG. 4 is a side view of a tank cap used in a fuel tank.

Alternatively, as shown in FIGS. 2, 3 and 4, a plurality of holes 22 are provided in an engaging member 24 whereas a plurality of claw parts 26 are provided in an attaching member 28, and a tank cap 30 is attached to an opening section of a fuel tank by engaging the claw parts 26 in the holes 22. In order to attach the tank cap 30 to the opening section of the fuel tank, the positioning of the tank cap 30 is needed. To this end, positioning projections 32 are provided in the tank cap 30, and the positioning projections 32 are inserted in positioning holes 34 provided in the engaging member 24. And the claw parts 26 of the attaching member 28 are inserted in the holes 22 of the engaging member 24, and then the attaching member 28 is turned to hold the tank cap 30 in position.

When the tank cap 30 is detached, tip ends of an attaching and detaching tool (not shown) are inserted in access holes 36 provided along an outer periphery of the attaching member 28, and the attaching and detaching tool and the attaching member 28 are turned together to detach the attaching member 28 and the tank cap 30.

At this time, the access holes 36 may be overlapped with the positioning projections 32, and consequently, the positioning projections 32 may be damaged.

SUMMARY OF THE INVENTION

Accordingly, it is an object of the present invention to provide a structure of an opening section of a fuel tank, which is capable of detaching a tank cap without damaging positioning projections provided in the tank cap.

In accordance with a first aspect of the present invention, in a structure of an opening section of a fuel tank, which is integrally formed in a tank main body of a thermoplastic synthetic resin, the opening section has a cylindrical portion extending outwardly from the tank main body, a metallic annular tank cap engaging member having a plurality of engaging holes is attached to the cylindrical portion, a metallic annular attaching member having a plurality of engaging claw parts adapted to be engaged in the engaging holes of the tank cap engaging member is engaged in the tank cap engaging member to hold a tank cap adapted to close an opening of the opening section with the attaching member and the tank cap engaging member. The tank cap has a tank cap positioning projection, and the tank cap engaging member has a positioning hole for insertion of the tank cap positioning projection, and at least one of the engaging claw parts of the attaching member and at least one of the engaging holes of the tank cap engaging member are respectively made longer in a circumferential direction than remaining engaging claw parts and remaining engaging holes.

In accordance with the first aspect of the present invention, the opening section has the cylindrical portion extending outwardly from the tank main body and the metallic annular tank cap engaging member having a plurality of engaging holes is attached to the cylindrical portion so that a peripheral part of the opening section can be made strong, and the tank cap engaging member can be securely attached to the attaching member.

The metallic annular attaching member having a plurality of engaging claw parts adapted to be engaged in the engaging holes of the tank cap engaging member is engaged in the tank cap engaging member to hold the tank cap adapted to close the opening of the opening section with the attaching member and the tank cap engaging member. With this arrangement, by inserting the engaging claw parts of the attaching member in the tank cap engaging member, and turning the attaching member, the tank cap can be securely held with engaging claw parts, thereby closing the opening completely.

The tank cap has a tank cap positioning projection, and the tank cap engaging member has a positioning hole for insertion of the tank cap positioning projection. With this arrangement, when the tank cap is attached to the opening section of the fuel tank, the attached position of the tank cap is determined, whereby parts assembled in the tank cap can be located in prescribed positions and the tank cap is prevented from slipping even when the attaching member is turned.

At least one engaging claw part of the attaching member and at least one engaging hole of the tank cap engaging member are respectively made longer in a circumferential direction than remaining engaging claw parts and remaining engaging holes so that when the attaching member is fitted in the tank cap engaging member, the longer engaging claw part can be securely inserted in the longer engaging hole, and consequently, access holes can be located in such positions as not to contact the tank cap positioning projection. Therefore, when the attaching member is turned, the engaging claw parts do not damage the tank cap positioning projection.

In accordance with a second aspect of the present invention, an access hole is provided in the attaching member for insertion of a tool adapted to open the attaching member, and the longer engaging claw part and the longer engaging hole are respectively provided away from the access hole and the positioning hole of the tank cap engaging member such that the access hole and the positioning hole do not overlap with each other.

In accordance with the second aspect of the present invention, the access hole is provided in the attaching member for insertion of a tool adapted to open the attaching member, and the longer engaging claw part and the longer engaging hole are respectively provided away from the access hole and the positioning hole of the tank cap engaging member such that the access hole and the positioning hole do not overlap with each other. With this arrangement, by inserting the tool in the access hole, and turning the attaching member, the attaching member can be detached from the tank cap, and a tip end of the tool inserted in the access hole and the longer engaging claw do not contact the tank cap positioning projection so as not to damage the same.

In accordance with a third aspect of the present invention, a surface of the attaching member, which contacts the tank cap, has a plurality of grooves extending radially of the attaching member.

In accordance with the third aspect of the present invention, since the surface of the attaching member, which contacts the tank cap, has a plurality of grooves extending radially of the attaching member, water gathered between the tank cap and the attaching member can be discharged outwardly of the opening via the grooves.

In accordance with a fourth aspect of the present invention, the attaching member has an annular upper flat part including a plane surface extending in parallel with an open end of the opening section, which is adapted to press a peripheral portion of the tank cap on the opening section, and a plurality of lower vertical walls projecting from a periphery of the upper flat part downwardly, which are adapted to be inserted in engaging holes provided in the tank cap engaging member, and the engaging claw parts of the attaching member bend from tip ends of the lower vertical walls towards an axial center of the opening section into an L-shaped configuration, which are adapted to contact a lower surface of the tank cap engaging member.

In accordance with the fourth aspect of the present invention, the attaching member has the annular upper flat part including a plane surface extending in parallel with the open end of the opening section, which is adapted to press a peripheral portion of the tank cap on the opening section, so that when the attaching member is attached to the tank cap engaging member, an entire periphery of the tank cap adapted to close the open end is pressed with the upper flat part to bring the tank cap into close contact with the opening section, and consequently, the sealing properties between the opening section and the tank cap can be effected.

The attaching member has a plurality of lower vertical walls projecting from the periphery of the upper flat part downwardly, which are adapted to be inserted in engaging holes provided in the tank cap engaging member, and the engaging claw parts bend from tip ends of the lower vertical walls towards an axial center of the opening section into an L-shaped configuration, which are adapted to contact a lower surface of the tank cap engaging member. With this arrangement, by inserting the lower vertical walls of the attaching member in the engaging holes of the tank cap engaging member, and turning the attaching member, the engaging claw parts are brought into close contact with the lower surface of the tank cap engaging member, whereby the attaching member can be securely attached to the tank cap engaging member.

In addition, since the attaching member has a camlock structure, the tank cap can be engaged by slightly turning the tank cap and the attaching member, thereby facilitating the assembling of the attaching member, and decreasing the height of the opening section, In accordance with a fifth aspect of the present invention, the attaching member has an annular upper flat part including a plane surface extending in parallel with an open end of the opening section, which is adapted to press a peripheral portion of the tank cap on the opening section, and a flange part projecting from a periphery of the upper flat part upwardly close to members projecting provided on an upper surface of the tank cap.

In accordance with the fifth aspect of the present invention, since the flange part is provided so as to project from the upper flat part upwardly close to the members projecting from the upper surface of the tank cap, members provided on the upper surface of the tank cap, such as a hose attaching member, a socket, etc. can be protected with the flange part.

In accordance with a sixth aspect of the present invention, the attaching member has an annular upper flat part including a plane surface extending in parallel with an open end of the opening section, which is adapted to press a peripheral portion of the tank cap on the opening section, an upper vertical wall projecting from an inner periphery of the upper flat part upwardly, and a flange part projecting from one part of the upper vertical wall upwardly close to members projecting from an upper surface of the tank cap.

In accordance with the sixth aspect of the present invention, since the upper vertical wall part is provided so as to project from an inner periphery of the upper flat part, and a flange part projects from one part of the upper vertical wall part upwardly close to the members projecting from the upper surface of the tank cap, the flange part can be provided close to the members projecting from the upper surface of the tank cap, such as a hose attaching member, a socket, etc., and they can be protected with the flange part.

In accordance with a seventh aspect of the present invention, the tank cap engaging member includes an annular upper surface part having a flat surface with a plurality of engaging holes, each having a wide part and a narrow part which extend in a circumferential direction thereof, which extends in parallel with an open end of the opening section, an engaging step bending downwardly from the engaging upper surface part, an engaging flat part bending from the engaging step toward an axial center of the opening section into an L-shaped cross-section to define a flat surface extending in parallel with the open end, and an engaging vertical wall bending downwardly from the engaging flat part, and the metallic annular tank cap engaging member provided with a plurality of engaging holes is partially embedded integrally in the cylindrical portion.

In accordance with the seventh aspect of the present invention, the tank cap engaging member includes an annular upper surface part having a flat surface with a plurality of engaging holes, each having a wide part and a narrow part which extend in a circumferential direction thereof, which extends in parallel with an open end of the opening section. Therefore, by inserting the engaging claw parts of the attaching member in the wide parts of the engaging holes, and turning the attaching member such that the engaging claw parts enter the narrow parts of the engaging holes, the attaching member can be securely attached to the tank cap engaging member. In addition, since the upper surface part extends in parallel with the open end of the opening section, the tank cap engaging member does not protrude from the opening section to decrease a space required for attaching the fuel tank.

Since the tank cap engaging member has an engaging step bending downwardly from the upper surface part, a peripheral part of the bending portion can be held, and the flat part of the tank cap engaging member can be located under a lower surface of the bending portion.

The tank cap engaging member has the flat part bending from the engaging step toward an axial center of the opening section into an L-shaped cross-section to define a flat surface extending in parallel with the open end so that when the lower surface of the bending portion is held with the tank cap engaging member, and the tank cap is pressed with the attaching member, the tank cap can be held with the flat part of the tank cap engaging member and the upper flat part of the attaching member.

Since the tank cap engaging member has an engaging vertical wall bending downwardly from the engaging flat part, the engaging vertical wall is embedded in the cylindrical portion of the opening section, whereby an entire part of the tank cap engaging member can be securely held, and the strength of the cylindrical portion can be enhanced radially.

In accordance with an eighth aspect of the present invention, the opening section has a cylindrical portion extending outwardly from the tank main body, and a bending portion bending from an extending end of the cylindrical portion radially and outwardly, and further bending toward an axial center of the opening section into a hairpin configuration such that layers of a thermoplastic synthetic resin are doubled vertically to define a surface extending in parallel with the open end of the opening section, at least one part of the bending portion includes a compressed area with a wall thickness less than that of a remaining area, which is depressed in a vertical direction to the open end, to define a groove having a U-shaped cross-section with a smooth bottom surface, and a sealing member is attached in the groove.

In accordance with the eighth aspect of the present invention, the opening section has a cylindrical portion extending outwardly from the tank main body, and a bending portion bending from an extending end of the cylindrical portion radially and outwardly, and further bending toward an axial center of the opening section into a hairpin configuration such that layers of a thermoplastic synthetic resin are doubled vertically to define a surface extending in parallel with the open end of the opening section. Therefore, the opening section is integrally formed with the tank main body to exhibit excellent sealing properties, and the wall thickness of the bending portion can be ensured, whereby the sealing member can be held. Since an outer layer of the bending portion is defined with an outer layer of the tank main body, the strength of the bending portion can be ensured, and since the bending portion has an intermediate layer composed of a fuel permeation-inhibiting material, the permeation of fuel can be prevented.

Since at least one part of the bending portion includes a compressed area with a wall thickness less than that of a remaining area, which is depressed in a vertical direction to the open end of the opening section, the wall thickness of the compressed area can be decreased, and consequently, the permeation of the fuel from an end of the opening section via the compressed area can be minimized. In addition, the sealing member can be fitted in the thin-walled part, thereby ensuring the sealing properties. And, by compressing the compressed area, a smoother surface can be formed, thereby providing a more secure seal.

Since the compressed area defines a groove having a U-shaped cross-section, a smooth bottom surface is formed therein, and a sealing member is attached to the groove, the sealing member can be securely held in the groove, and is pressed with the tank cap to be brought into close contact with the smooth bottom surface, thereby providing a secure seal between the opening section and the tank cap.

In accordance with the present invention, the tank cap has a positioning projection, whereas the tank cap engaging member has a positioning hole for insertion of the positioning projection. Therefore, when the tank cap is attached to the opening section of the fuel tank, the tank cap can be attached in position, and parts assembled in the tank cap can be located in prescribed positions, and when the attaching member is turned, the tank cap is prevented from slipping relative to the opening section.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, embodiments of a fuel tank of the present invention will be explained based on a fuel tank for use in a motor vehicle with reference to FIG. 4 through FIG. 13. First, a first embodiment of the present invention will be explained, and next, a second embodiment will be explained.

Figure 5:
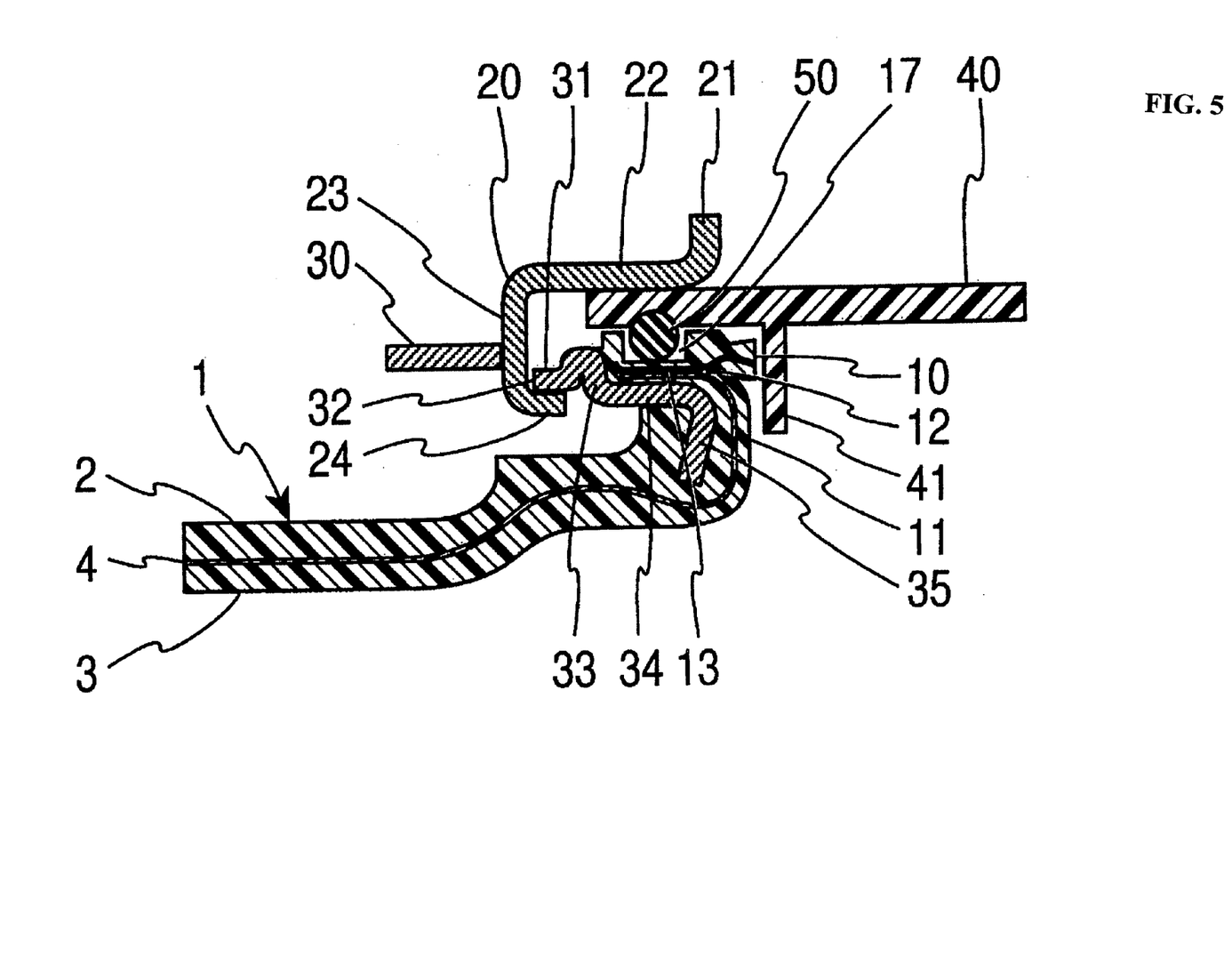
FIG. 5 is an enlarged sectional view of an opening section of a tank main body of a fuel tank in a first embodiment of the present invention.
Figure 6:
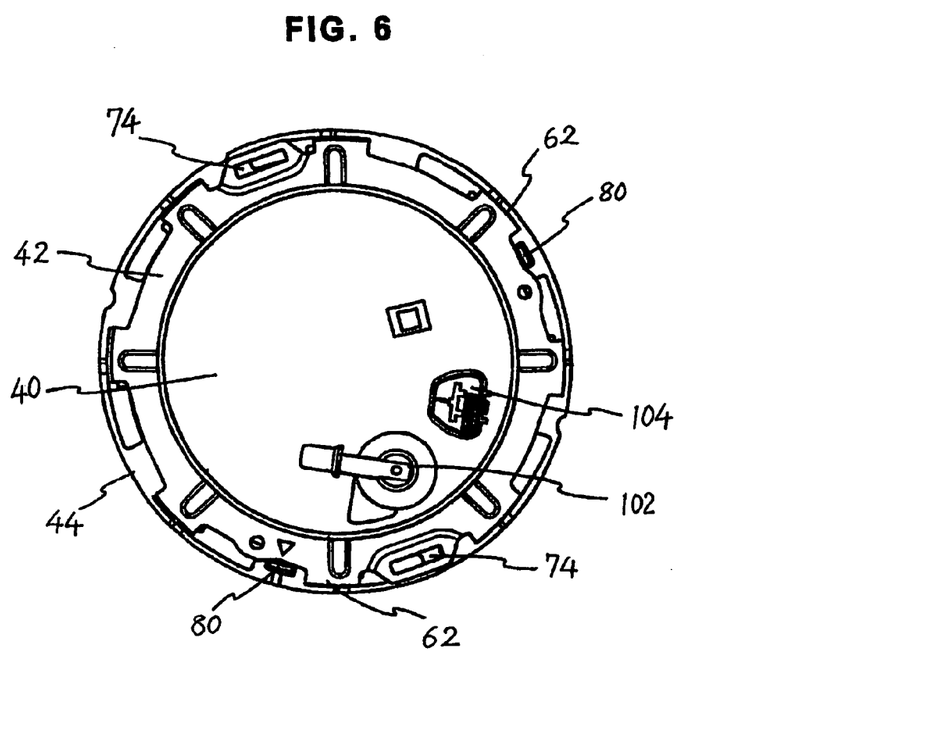
FIG. 6 is a plan view of the opening section in the first embodiment of the present invention.

FIG. 5 is an enlarged sectional view of an opening section 38 of a fuel tank in the first embodiment, which is adapted to engage a tank cap therein. And FIG. 6 is a plan view of the opening section 38 in which a tank opening is closed with a tank cap 40.

Figure 7:
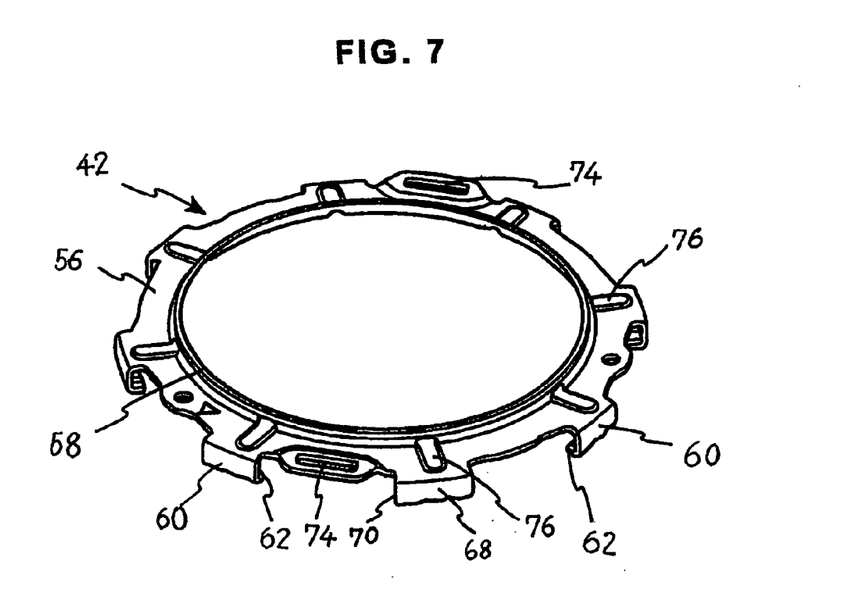
FIG. 7 is a perspective view of a lock plate used in the first embodiment of the present invention.
Figure 8:
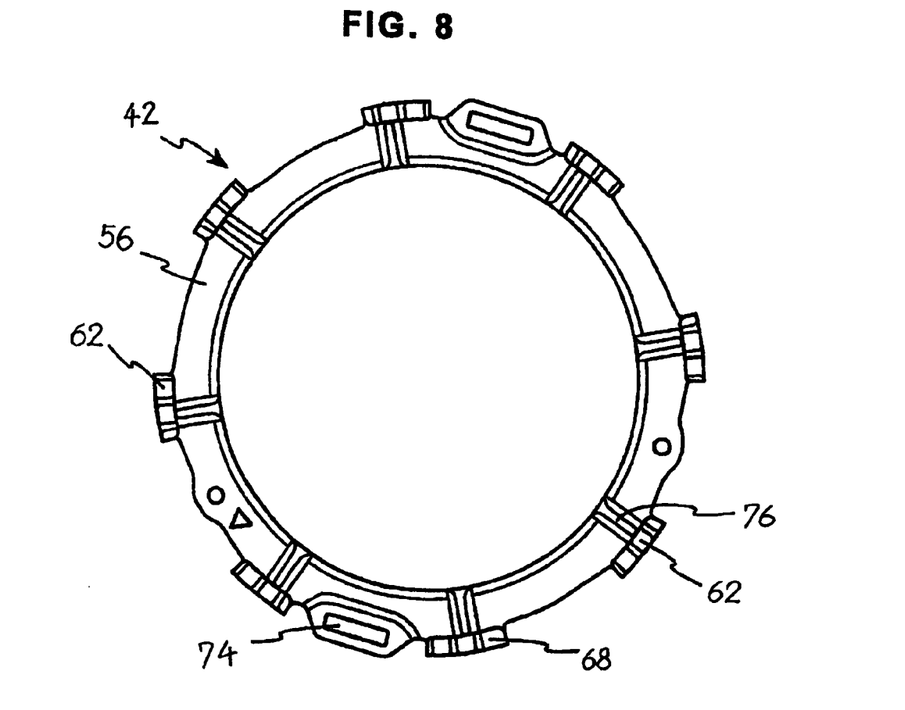
FIG. 8 is a plan view of the lock plate used in the first embodiment of the present invention.

FIG. 7 is a perspective view of a lock plate 42 as an attaching member adapted to attach the tank cap 40 in the first embodiment of the present invention, and FIG. 8 is a plan view of the lock plate 42.

Figure 9:
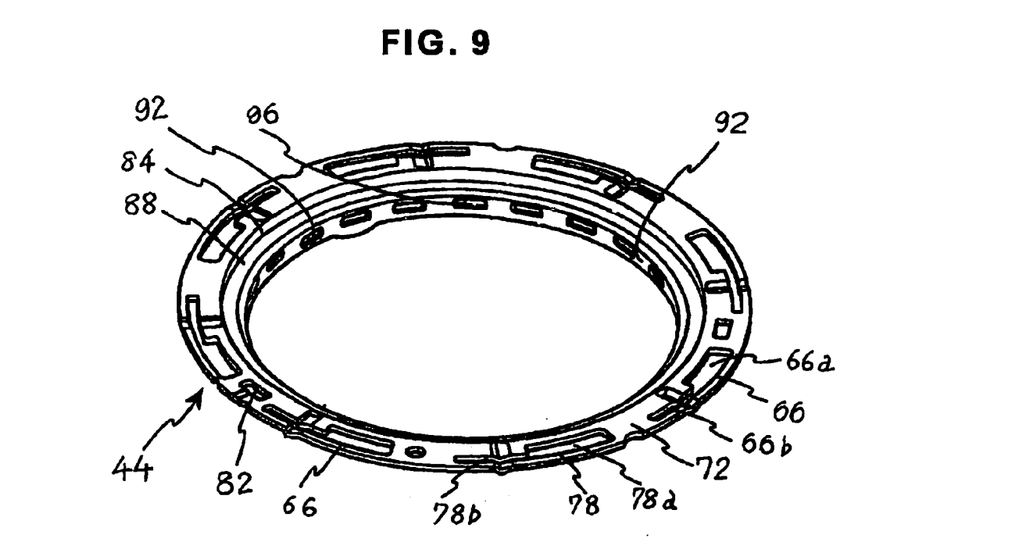
FIG. 9 is a perspective view of an engaging ring used in the first embodiment of the present invention.
Figure 10:
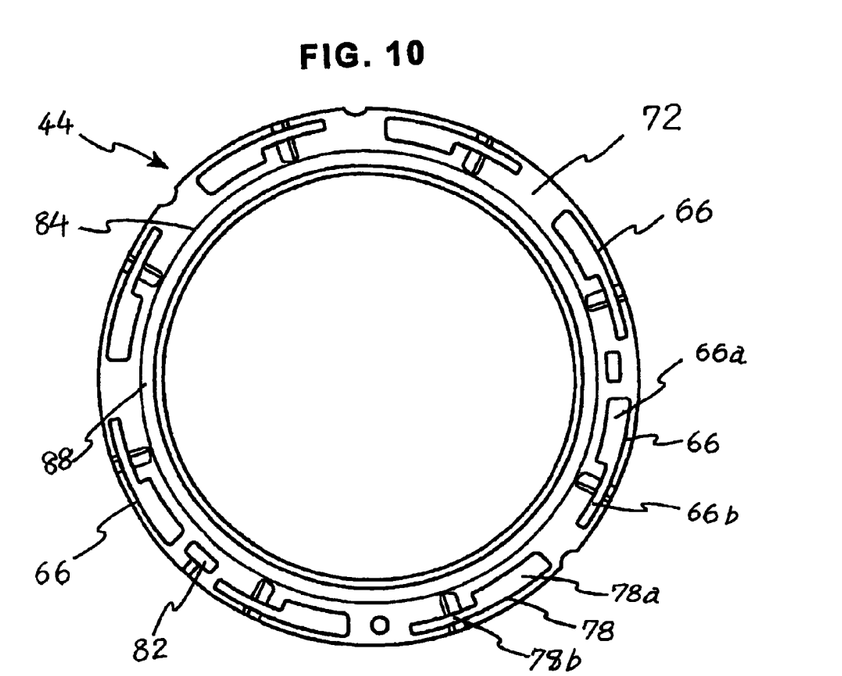
FIG. 10 is a plan view of an engaging ring used in the first embodiment of the present invention.
Figure 11:
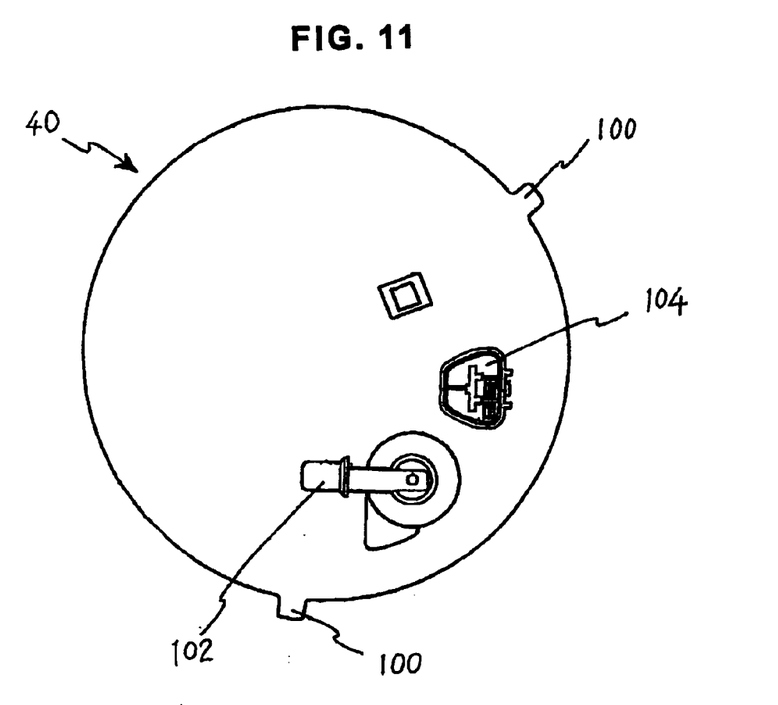
FIG. 11 is a plan view of a tank cap used in the first embodiment of the present invention.

FIG. 9 is a perspective view of an engaging ring 44 as a tank cap engaging member, which is provided in the opening section 38 of the first embodiment of the present invention, and FIG. 10 is a plan view of the engaging ring 44. FIG. 11 is a plan view of the tank cap 40 adapted to close the opening section 38 in the first embodiment of the present invention, and FIG. 4 is a side view of the tank cap 40.

Figure 12:
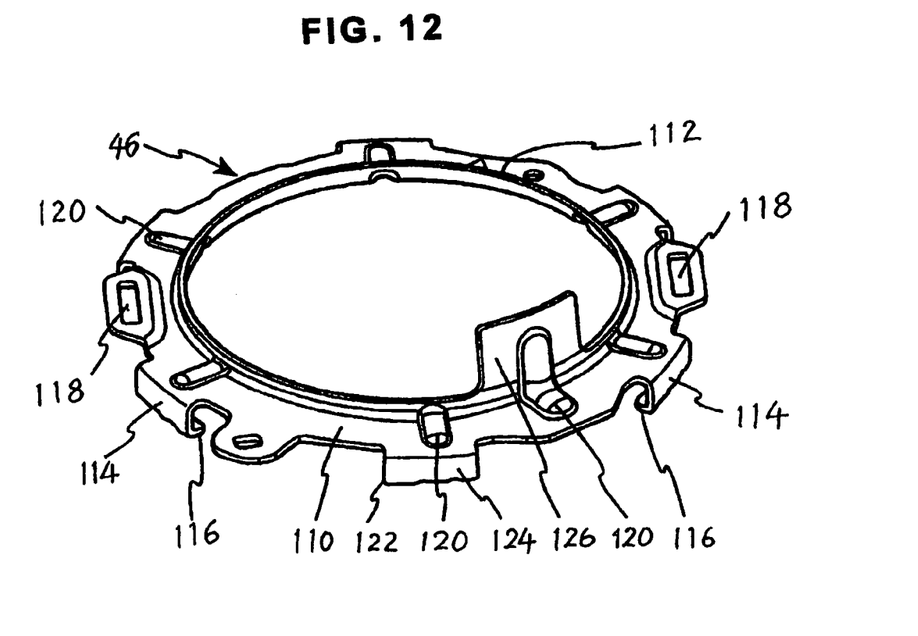
FIG. 12 is a perspective view of a lock plate used in a second embodiment of the present invention.
Figure 13:
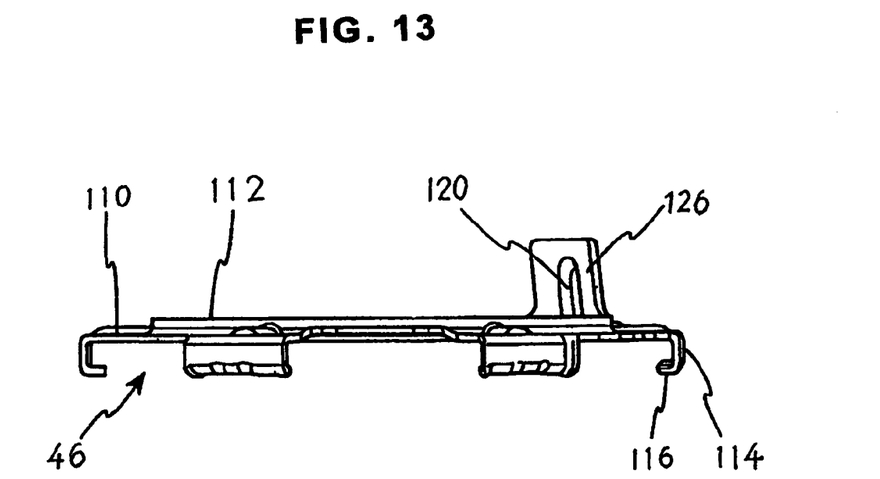
FIG. 13 is a side view of a lock plate used in the second embodiment of the present invention.

FIG. 12 and FIG. 13 are respectively a perspective view of a lock plate 46 as an attaching member adapted to attach a tank cap in a second embodiment of the present invention; and a side view of the lock plate 46.

In the first embodiment of the present invention, as shown in FIG. 5, a fuel tank includes a tank main body 48 and an opening section 38 adapted to remove and put fuel pumps (not shown) from and in the tank main body 48.

The tank main body 48 is formed by the blow molding method, and a wall of the tank main body 48 includes an outer layer 50, an inner layer 52 and an intermediate layer 54 interposed between the outer layer 50 and the inner layer 52. Upon blow molding, a parison composed of the above-described three layers is used.

The outer layer 50 and the inner layer 52 are made of a thermoplastic synthetic resin exhibiting high strength that is maintained against fuel oil, and the intermediate layer 54 is made of a thermoplastic synthetic resin exhibiting a very low permeability against fuel oil. Where the outer layer 50 or the inner layer 52 is made of the material exhibiting a low permeability against fuel oil, the intermediate layer 54 can be omitted.

The present invention will be explained based on the fuel tank formed by the blow molding method. The present invention is applicable to the fuel tank formed by the injection molding method.

As shown in FIG. 5, the opening section 38 is provided in an upper surface of the tank main body 48 of the fuel tank, and the tank cap 40 is attached to the opening section 38 and engaged therein.

As shown in FIGS. 5 and 6, the tank cap 40 is engaged in the opening section 38 by holding the tank cap 40 with a tank cap engaging member (engaging ring) 44 embedded in the opening section 38 and an attaching member (lock plate) 42. The engaging structure will be explained in detail.

The opening section 38 is integrally formed with the tank main body 48 using an identical material to each other so as to extend outwardly therefrom. The engaging ring 44 is embedded in the opening section 38.

First, the arrangement of the attaching member (lock plate) 42, the tank cap engaging member (engaging ring) 44 and the tank cap 40 will be explained, respectively, and next, the engaging structure in the opening section 38 will be explained.

As shown in FIGS. 7 and 8, the lock plate 42 adapted to hold the tank cap 40 is made of metal and has a ring-like configuration. The lock plate 42 has an upper flat part 56 having a flat plate-shaped cross section. An upper vertical wall 58 is formed along an inner periphery of the upper flat part 56 so as to extend upwardly.

A plurality of lower vertical walls 60, each having a predetermined width, are formed along an outer periphery of the upper flat part 56 of the lock plate 42 so as to extend downwardly. And a claw part 62 extends inwardly from a tip end of each of the lower vertical walls 60 into an L-shaped configuration.

When the lock plate 42 is attached to the engaging ring 44, the lower vertical walls 60 are inserted in engaging holes 66 of the engaging ring 44, and by turning the lock plate 42 slightly, the lock plate 42 takes a camlock structure so that the claw parts 62 are engaged with a lower surface of the engaging ring 44 to secure the lock plate 42 thereto, whereby the tank cap 40 can be held thereby.

Since the lower vertical wall 60 extends downwardly, the height of the opening section 38 can be made smaller. As shown in FIG. 9, the engaging holes 66 of the engaging ring 44 are provided in the positions corresponding to the claw parts 62. By inserting the claw parts 62 in the engaging holes 66, the tank cap 40 can be engaged.

At least one lower vertical wall part and at least one claw part provided in the lock plate 42 are respectively made longer in a circumferential direction, than each of remaining lower vertical wall parts 60 and remaining claw parts 62. Thus, an enlarged lower vertical wall part 68 and an enlarged claw part 70 are formed.

The claw parts 62 can be formed into a wave-shaped bending configuration. With this arrangement, the claw parts 62 and a later describing upper plane part 72 achieve a spring action to enable the secure engagement of the tank cap 40.

The upper flat part 56 of the lock plate 42 partially extends radially to define access holes 74. It is preferable to provide a plurality of access holes. In FIGS. 6, 7 and 8, two access holes 74 are provided. Alternatively, two or more access holes can be formed. The access holes 74 are adapted to insert tools upon detaching the lock plate 42. It is preferable that the access holes are formed away from the lower vertical walls 60 inclusive of the claw parts 62, and the enlarged lower vertical wall 68 inclusive of the enlarged claw pieces 70.

A plurality of grooves 76 can be formed in a surface of the upper flat part 56, which contacts the tank cap 40. The grooves 76 extend radially, and are recessed upwardly. When the tank cap 40 is attached, water remaining between the tank cap 40 and the upper vertical wall 58 of the lock plate 42 can be discharged outwardly of the opening section 38 via the grooves 76.

Next, the engaging ring 44 will be explained. As shown in FIGS. 9 and 10, the engaging ring 44 is composed of a metal plate, and is formed into a generally cylindrical configuration.

The engaging ring 44 includes an annular upper plane part 72 having a flat surface extending in parallel with an open end of the opening section 38. The upper plane part 72 has a plurality of engaging holes 66, each extending in a circumferential direction. Each of the engaging holes 66 has a wide part 66a and a narrow part 66b which are interconnected with each other in a circumferential direction.

Upon attaching the lock plate 42 to the engaging ring 44, as shown in FIG. 5, the lower vertical wall 60 and the claw part 62 of the lock plate 42 are inserted in the wide part 66a of each engaging hole 66. And by turning the lock plate 42 such that the lower vertical wall 60 enters the narrow part 66b of the engaging hole 66, the claw part 62 closely contacts the lower surface of the upper plane part 72, whereby the lock plate 42 can be attached securely. In addition, the upper plane part 72 is arranged in parallel with the open end of the opening section 38 so that the lower vertical wall 60, etc. do not project from the opening section 38, thereby decreasing a space required for attaching the tank main body 48.

In the engaging ring 44, enlarged engaging holes 78 are provided for engagement with the enlarged claw parts 70 of the lock plate 42. A wide part 78a and a narrow part 78b of each of the enlarged engaging holes 78 are respectively made longer in a circumference direction, as compared with the wide part 66a and the narrow part 66b of the other engaging holes 66. With this arrangement, when the lock plate 42 is fitted in the engaging ring 44, the enlarged claw parts 70 can be securely inserted in the enlarged engaging holes 78. As a result, the access holes 74 can be prevented from overlapping with later-describing tank cap positioning projections, and consequently, when the lock plate 42 is turned, tip ends of tools, which are inserted in the access holes 74, the claw parts 62 and the enlarged claw parts 70 do not damage the tank cap positioning projections.

In the upper plane part 72, a plurality of positioning holes 82 are provided between adjacent engaging holes 66. When the tank cap 40 is attached to the opening section 38, the tank cap positioning projections are inserted in the positioning holes 82.

A step 84 is provided along an inner periphery of the upper plane part 72 so as to extend downwardly. An outside end of a later-describing bending portion 86 provided in the opening section 38 contacts the step 84, thereby holding the engaging ring 44. As a result, the strength of the opening section 38 can be enhanced. In addition, by virtue of the step 84, a flat part 88 of the engaging ring 44 can be positioned under a lower surface of the bending portion 86 of the opening section 38.

The flat part 88 is formed to bend from the step 84 toward an axial center of the opening section 38 into an L-shaped configuration, and extend in parallel with the open end thereof. The flat part 88 holds a lower surface of a later-describing compressed area 90 of the opening section 38, and when the tank cap 40 is pressed with the upper flat part 56 of the lock plate 42, the flat part 88 of the engaging ring 44 and the upper flat part 56 of the lock plate 42 can hold the tank cap 40. In addition, when the compressed area 90 of the opening section 38 is formed, the bending portion 86 of the opening section 38 is held with the engaging ring 44 from the lower side thereof, whereby the compression of the bending portion 86 is readily achieved. As a result, when the tank cap 40 is attached to the opening section 38, the tank cap 40 can be strongly pressed on the bending portion 86.

A vertical wall 92 bends from the flat part 88 downwardly into a cylindrical configuration. When the engaging ring 44 is embedded in the opening section 38, the vertical wall 92 is embedded in a cylindrical portion 94 of the opening section 38. Consequently, the engaging ring 44 is strongly held with the vertical wall 92, and the radial strength of the cylindrical portion 94 of the opening section 38 can be enhanced with the vertical wall 92.

As shown in FIG. 9, the vertical wall 92 has a plurality of fixing holes 96. Upon blow molding, a thermoplastic synthetic resin material enters the fixing holes 96 from the cylindrical portion 94 of the opening section 38, thereby securing the engaging ring 44 to the opening section 38 without slipping in an interior of the cylindrical portion 94 of the opening section 38. In the case of the injection molding, the thermoplastic synthetic material can also enter the fixing holes 96, similarly.

A plurality of wave-shaped notches can be formed along a lower end of the vertical wall 92 in place of the fixing holes 96. In this case, during the blow molding, the thermoplastic synthetic resin material enters the notches from the cylindrical portion 94 to secure the engaging ring 44 to the opening section 38.

As shown in FIGS. 4 and 11, the tank cap 40 has a generally circular disc-shaped configuration, and is provided with a flange 98 projecting downwardly from a periphery of the tank cap 40. Protrusions 100 are provided to protrude from the periphery of the tank cap 40 horizontally and outwardly, and, the tank cap positioning projections 80 extend downwardly from a tip end of each of the protrusions 100. A plurality of the tank cap positioning projections 80 can be formed.

The tank cap positioning projections 80 are inserted in the positioning holes 82 of the engaging ring 44. Therefore, when the tank cap 40 is attached to the opening section 38 of the fuel tank, the attaching position of the tank cap 40 is secured, and the parts assembled in the tank cap 40 can be located in prescribed positions, and when the lock plate 42 is turned, the tank cap 40 is prevented from slipping relative to the lock plate 42.

A hose attaching member 102 adapted to attach a hose for feeding fuel or an evaporated fuel, and a socket 104 for a fuel pump, etc. are secured to an upper surface of the tank cap 40. Therefore, it is necessary that the tank cap 40 is attached to a prescribed position without any slippage.

As shown in FIG. 5, the opening section 38 includes the cylindrical portion 94 and the bending portion 86.

The thermoplastic synthetic resin wall composed of the outer layer 50, the inner layer 52 and the intermediate layer 54, which define the wall of the tank main body 48 of the fuel tank, extends outwardly of the tank main body 48 into a cylindrical configuration, thereby defining the cylindrical portion 94. The vertical wall 92 of the engaging ring 44 is embedded in the outer layer 50 of the cylindrical portion 94. The thermoplastic synthetic resin material composing the outer layer 50 enters the fixing holes 96 or the notches of the engaging ring 44. With this arrangement, the engaging ring 44 can be strongly secured to the opening section 38.

The thermoplastic synthetic resin composing the outer layer 50 and the inner layer 52 may be composed of at least one of materials including high density polyethylene (HDPE), polyoxymethylene (POM), ethylene vinyl alcohol copolymer (EVOH), nylon, polybuthylene terephthalate, polyethylene telephthalate, and polyphenylene sulfide.

In addition, the thermoplastic synthetic resin composing the intermediate layer 54 can be selected from the materials including ethylene vinyl alcohol copolymer (EVOH), polybuthylene telephthalate, polyethylene telephthalate, and polyphenylene sulfide (PPS).

When a multilayered parison in which such a layer as to exhibit good adhesive property against high density polyethylene (HDPE), such as an adhesive layer of modified polyethylene (m-PE), etc. is used on both sides of the intermediate layer 54 such as ethylene vinyl alcohol copolymer, the adhesive properties between three layers are improved, which is preferable.

The bending portion 86 is formed integrally and continuously with an end of the cylindrical portion 94 of the opening section 38, and bends radially outwardly. The bending portion 86 is further bent in about a radially center thereof toward an axial center of the opening section 38 into a hairpin configuration such that thermoplastic synthetic resin layers are laminated vertically to define a tank open end face of the opening section 38.

As a result, in the bending portion 86, the outer layer 50, the inner layer 52 and the intermediate layer 54 are doubled vertically. Therefore, the opening section 38 is formed continously and integrally with the tank main body 48 using the same materials as those of the tank main body 48 to exhibit excellent sealing properties, and the bending portion 86 except for the compressed area 90 thereof has a sufficient wall thickness to ensure good strength. In addition, by virtue of the intermediate layer 54, fuel permeation can be prevented.

The compressed area 90 of the bending portion 86 is formed in about a center thereof so as to have a wall thickness less than that of the remaining area thereof, thereby defining a groove 106 with a U-shaped cross-section over an entire circumference of the opening section 38. A seal ring 108 made of rubber and having a circular cross-section is fitted in the groove 106. When the tank cap 40 is attached to the opening section 38, the seal ring 108 contacts a reverse surface of the tank cap 40 to provide a seal between the tank cap 40 and the opening section 38. Since the seal ring 108 is fitted in the groove 106, the seal ring 108 can be securely held in a prescribed position required for sealing the tank cap 40.

In order to close the opening section 38 of the tank main body 48 of the fuel tank, the tank cap 40 is placed on the upper plane part 72 of the engaging ring 44, the claw parts 62 of the lock plate 42 are inserted in the wide parts 66a of the engaging holes 66, whereas the enlarged claw parts 70 are inserted in the wide parts 78a of the enlarged engaging holes 78. Then, the lock plate 42 is turned to fit the claw parts 62 and the enlarged claw parts 70 in the narrow parts 66b and 78b, respectively. FIG. 6 shows the state where the tank cap 40 is attached to the opening section 38.

As a result, the annular upper flat part 56 of the lock plate 42 can press the periphery of the tank cap 40 on the opening section 38. Therefore, the tank cap 40 can be brought into close contact with the opening section 38, thereby ensuring sealing properties.

When the lock plate 42 is fitted in the engaging ring 44, the enlarged claw parts 70 cannot be inserted in other holes than the enlarged engaging holes 78 so as to be securely inserted in the enlarged engaging holes 78. Therefore, as shown in FIG. 6, the access holes 74 can be prevented from overlapping with the positions of the tank cap positioning projections 80.

When the lock plate 42 is detached, tools are inserted in the access holes 74 to turn the lock plate 42. When the lock plate 42 is turned in an opposite direction, the claw parts 62 and tip ends of the tools do not damage the tank cap positioning projections 80.

Next, a second embodiment of the present invention will be explained. The second embodiment differs from the first embodiment in that the lock plate has a flange part. The structure of the second embodiment will be explained with respect to only differences from that of the first embodiment, and explanations of common parts will be omitted.

As shown in FIG. 12 and FIG. 13, in the second embodiment of the present invention, the lock plate 46 is formed of metal and has a ring-shaped configuration, and includes an upper flat part 110, similarly to the first embodiment. An upper vertical wall 112 is formed to extend upwardly from an inner periphery of the upper flat part 110

A plurality of lower vertical walls 114, each having a predetermined width, extend from an outer periphery of the upper flat part 110 of the lock plate 46. A claw part 116 extends inwardly from a tip end of each of the lower vertical walls 114 into an L-shaped configuration. And access holes 118, grooves 120, enlarged claw parts 122 and the enlarged lower vertical walls 124 are also provided, similarly to the first embodiment.

A flange part 126 is provided to protrude upwardly from one part of the upper vertical wall 112 close to the hose attaching part 102 and the socket 104 for a fuel pump, etc. (FIG. 4) projecting from an upper surface of the tank cap 40. The flange part 126 can be provided close to the hose attaching part 102, the socket 104, etc. provided on the upper surface of the tank cap 40, whereby when the tank main body 48 of the fuel tank is attached to a vehicle body or repaired, these members can be protected with the flange part 126.

Where the upper vertical wall 112 is not provided, the flange part 126 may be provided to project directly from the upper flat part 110.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A structure of an opening section of a fuel tank, which is integrally formed in a tank main body made of a thermoplastic synthetic resin, wherein
said opening section has a cylindrical portion extending outwardly from said tank main body,
a metallic annular tank cap engaging member having a plurality of engaging holes is attached to said cylindrical portion,
a metallic annular attaching member having a plurality of engaging claw parts adapted to be engaged in said engaging holes of said tank cap engaging member is engaged in said tank cap engaging member to hold a tank cap adapted to close an opening of said opening section with said attaching member and said tank cap engaging member,
said tank cap has a tank cap positioning projection, and said tank cap engaging member has a positioning hole for insertion of said tank cap positioning projection, and
at least one of said engaging claw parts of said attaching member and at least one of said engaging holes of said tank cap engaging member are respectively are made longer in a circumferential direction than remaining engaging claw parts and remaining engaging holes.

2. A structure of an opening section of a fuel tank, as claimed in claim 1, wherein an access hole is provided in said attaching member for insertion of tools adapted to be used upon opening said attaching member, and said at least one of said engaging claw parts and said at least one of said engaging holes are respectively provided away from said access hole and said positioning hole of said tank cap engaging member such that said access hole and said positioning hole do not overlap with each other.

3. A structure of an opening section of a fuel tank, as claimed in claim 1, wherein a surface of said attaching member, which contacts said tank cap, has a plurality of grooves extending radially of said attaching member.

4. A structure of an opening section of a fuel tank, as claimed in claim 1, wherein said attaching member has an annular upper flat part including a plane surface extending in parallel with an open end of said opening section, which is adapted to press a peripheral portion of said tank cap on said opening section, and a plurality of lower vertical walls projecting from a periphery of said upper flat part downwardly, which are adapted to be inserted in engaging holes provided in said tank cap engaging member, and said engaging claw parts bend from tip ends of said lower vertical walls towards an axial center of said opening section into an L-shaped configuration, which are adapted to contact a lower surface of said tank cap engaging member.

5. A structure of an opening section of a fuel tank, as claimed in claim 1, wherein said attaching member has an annular upper flat part including a plane surface extending in parallel with an open end of said opening section, which is adapted to press a peripheral portion of said tank cap on said opening section, and a flange part projecting from a periphery of said upper flat part upwardly close to members provided on an upper surface of said tank cap.

6. A structure of an opening section of a fuel tank, as claimed in claim 1, wherein said attaching member has an annular upper flat part including a plane surface extending in parallel with an open end of said opening section, which is adapted to press a peripheral portion of said tank cap on said opening section, an upper vertical wall projecting from an inner periphery of said upper flat part upwardly, and a flange part projecting from one part of said upper vertical wall upwardly close to members provided on an upper surface of said tank cap.

7. A structure of an opening section of a fuel tank, as claimed in claim 1, wherein said tank cap engaging member includes an annular upper surface part having a flat surface with a plurality of engaging holes, each having a wide part and a narrow part which extend in a circumferential direction thereof, which extends in parallel with an open end of the opening section, an engaging step bending downwardly from said upper surface part, an engaging flat part bending from said engaging step toward an axial center of said opening section into an L-shaped cross-section to define a flat surface extending in parallel with said open end, and an engaging vertical wall bending downwardly of said engaging flat part, and said metallic annular tank cap engaging member provided with a plurality of engaging holes is partially embedded integrally in said cylindrical portion.

8. A structure of an opening section of a fuel tank, as claimed in claim 1, wherein said opening section has a bending portion bending from an extending end of said cylindrical portion radially and outwardly, and further bending toward an axial center of said opening section into a hairpin configuration such that layers of a thermoplastic synthetic resin are doubled vertically to define a surface extending in parallel with said open end of said opening section, at least one part of said bending portion has a compressed area with a wall thickness less than that of a remaining area, which is depressed in a vertical direction to said open end, to define a groove having a U-shaped cross-section with a smooth bottom surface, and a seal member is attached in said groove.

\* \* \* \* \*